US012571505B2

(12) United States Patent
Shao et al.

(10) Patent No.: US 12,571,505 B2
(45) Date of Patent: Mar. 10, 2026

(54) METHOD AND SYSTEM FOR PIPELINE WASTE GAS SAFETY TREATMENT OF SMART GAS BASED ON INTERNET OF THINGS (IOT)

(71) Applicant: CHENGDU QINCHUAN IOT TECHNOLOGY CO., LTD., Chengdu (CN)

(72) Inventors: Zehua Shao, Chengdu (CN); Yaqiang Quan, Chengdu (CN); Lei He, Chengdu (CN); Yuefei Wu, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 19/186,542

(22) Filed: Apr. 22, 2025

(65) Prior Publication Data

US 2025/0251097 A1 Aug. 7, 2025

(30) Foreign Application Priority Data

Feb. 28, 2025 (CN) ........................ 202510230766.7

(51) Int. Cl.
*F17D 5/00* (2006.01)
*G06Q 50/06* (2012.01)

(52) U.S. Cl.
CPC ............. *F17D 5/005* (2013.01); *G06Q 50/06* (2013.01)

(58) Field of Classification Search
CPC ........................................................ F17D 5/005
See application file for complete search history.

(56) References Cited

U.S. PATENT DOCUMENTS

2003/0171879 A1 9/2003 Pittalwala et al.
2020/0240590 A1 * 7/2020 Ortiz ........................ F17D 3/01
(Continued)

FOREIGN PATENT DOCUMENTS

CN 216259902 U 4/2022
CN 117217412 A 12/2023
(Continued)

OTHER PUBLICATIONS

Hou, Yiming et al., Monitoring System for Mineral Processing Equipment Based on IoT and Industrial Cloud Computing, Computer Integrated Manufacturing Systems, 23(9): 1972-1982, 2017.
(Continued)

*Primary Examiner* — Ricky Go
(74) *Attorney, Agent, or Firm* — METIS IP LLC

(57) ABSTRACT

Disclosed is a method and system for pipeline waste gas safety treatment of smart gas based on an Internet of Things (IoT). The system comprises a smart gas government safety supervision management platform, a smart gas government safety supervision sensor network platform, a gas company management platform, a gas company sensor network platform, and a smart gas equipment object platform. The gas company management platform includes a processor and is configured to: determine, a waste gas emission standard for a pending pipeline; in response to the pending pipeline beginning to emit waste gas, obtain an instant treatment parameter of a waste gas treatment device in the pending pipeline; determine an expected treatment parameter corresponding to a preset future time point; and generate an adjustment instruction to control the smart gas equipment object platform to adjust a treatment parameter of the waste gas treatment device based on the adjustment instruction.

8 Claims, 5 Drawing Sheets

(56) References Cited

U.S. PATENT DOCUMENTS

| | | | | |
|---|---|---|---|---|
| 2021/0132562 | A1* | 5/2021 | Abu Ghdaib | H04W 4/38 |
| 2023/0053545 | A1* | 2/2023 | Fanidakis | G05B 19/41875 |
| 2023/0071381 | A1* | 3/2023 | Shao | H04L 67/125 |
| 2023/0160539 | A1* | 5/2023 | Shao | F17D 5/005 48/193 |
| 2024/0375289 | A1 | 11/2024 | Shao et al. | |

FOREIGN PATENT DOCUMENTS

| | | | |
|---|---|---|---|
| CN | 118654240 | A | 9/2024 |
| CN | 119174962 | A | 12/2024 |
| CN | 119394373 | A | 2/2025 |
| JP | 2005199198 | A | 7/2005 |

OTHER PUBLICATIONS

First Office Action in Chinese Application No. 202510230766.7 mailed on Apr. 30, 2025, 18 pages.

Decision to Grant a Patent in Chinese Application No. 202510230766.7 mailed on May 22, 2025, 5 pages.

Lin, Huabao, Some Understandings and Experiences on the Management and Acceptance Monitoring of Waste Gas Pollution Sources in PU Synthetic Leather Enterprises, Chemical Engineering & Equipment, 2011, 5 pages.

* cited by examiner

METHOD AND SYSTEM FOR PIPELINE WASTE GAS SAFETY TREATMENT OF SMART GAS BASED ON INTERNET OF THINGS (IOT)

CROSS-REFERENCE TO RELATED APPLICATIONS

This application claims priority to Chinese Application No. 202510230766.7, filed on Feb. 28, 2025, the entire contents of which are incorporated herein by reference.

TECHNICAL FIELD

The present disclosure relates to the field of gas safety, and in particular to a method and system for pipeline waste gas safety treatment of smart gas based on an Internet of Things (IoT).

BACKGROUND

In the process of upgrading and repairing a gas pipeline, it needs to treat gas inside a local gas pipeline, such as venting, flaring, purging, etc. so as to reduce the gas concentration inside the gas pipeline to a safe range. However, existing venting equipment only satisfies qualitative requirements, such as reducing the gas pressure to a specific level, or reducing the gas concentration inside the gas pipeline to a specific range. The current process lacks the assessment of the treatment efficiency and process stability.

CN216259902U provides a device for natural gas waste gas treatment applied to a long-distance natural gas pipeline. The device for natural gas waste gas treatment is used for treating natural gas discharged from various pressure relief points of the long-distance pipeline by absorbing methane and other gases using an adsorption process, and cleaning the natural gas discharged from pressure relief before discharging into the atmosphere.

The above process treats the gases discharged from the pipeline using the device for natural gas waste gas treatment, but does not systematically assess the emission time and the emission risk of the waste gas, which has a safety hazard.

Therefore, it is desirable to provide a method and system for pipeline waste gas safety treatment of smart gas based on an Internet of Things (IoT), which can systematically manage and assess pipeline waste gas emission, thereby ensuring the safety of the waste gas emission.

SUMMARY

One of the embodiments of the present disclosure provides a system for pipeline waste gas safety treatment of smart gas based on an Internet of Things (IoT). The system may comprise a smart gas government safety supervision management platform, a smart gas government safety supervision sensor network platform, a gas company management platform, a gas company sensor network platform, and a smart gas equipment object platform. The gas company management platform may include a processor. The gas company management platform may be configured to: determine, based on a waste gas treatment level of a pending pipeline, a waste gas emission standard for the pending pipeline; in response to determining that the pending pipeline begins to emit waste gas, obtain, through the gas company sensor network platform, an instant treatment parameter of a waste gas treatment device in the pending pipeline from the smart gas equipment object platform; determine, based on at least one of the waste gas emission standard, the instant treatment parameter, and a waste gas feature, an expected treatment parameter corresponding to a preset future time point; and generate, based on the expected treatment parameter, an adjustment instruction and send the adjustment instruction to the smart gas equipment object platform through the gas company sensor network platform to control the smart gas equipment object platform to adjust a treatment parameter of the waste gas treatment device based on the adjustment instruction.

One of the embodiments of the present disclosure provides a method for pipeline waste gas safety treatment of smart gas based on an Internet of Things (IoT), implemented by a processor of a gas company management platform of a system for pipeline waste gas safety treatment of smart gas based on an IoT. The method may comprise determining, based on a waste gas treatment level of a pending pipeline, a waste gas emission standard for the pending pipeline; in response to determining that the pending pipeline begins to emit waste gas, obtaining, through a gas company sensor network platform, an instant treatment parameter of a waste gas treatment device in the pending pipeline from a smart gas equipment object platform; determining, based on at least one of the waste gas emission standard, the instant treatment parameter, and a waste gas feature, an expected treatment parameter corresponding to a preset future time point; and generating, based on the expected treatment parameter, an adjustment instruction and sending the adjustment instruction to the smart gas equipment object platform through the gas company sensor network platform to control the smart gas equipment object platform to adjust a treatment parameter of the waste gas treatment device based on the adjustment instruction.

One of the embodiments of the present disclosure provides a non-transitory computer-readable storage medium, comprising computer instructions that, when read by a computer, may direct the computer to implement the method for pipeline waste gas safety treatment of smart gas based on the IoT described above.

BRIEF DESCRIPTION OF THE DRAWINGS

The present disclosure will be further illustrated by way of exemplary embodiments, which will be described in detail by means of the accompanying drawings. These embodiments are not limiting, and in these embodiments, the same numbering indicates the same structure, wherein.

DETAILED DESCRIPTION

Figure 1:
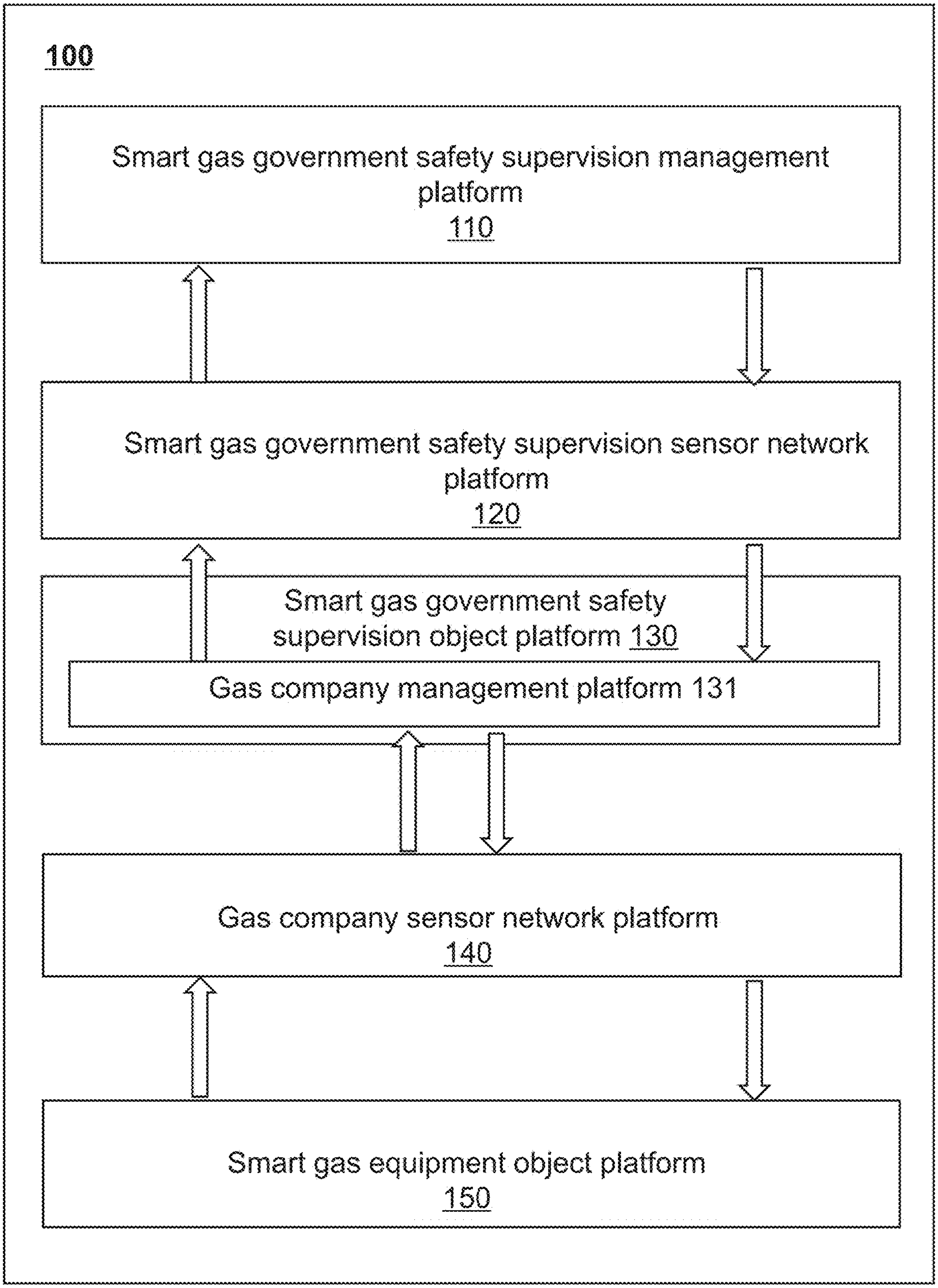
FIG. 1 is a schematic diagram illustrating a platform structure of an exemplary system for pipeline waste gas safety treatment of smart gas based on an IoT according to some embodiments of present disclosure.

In order to more clearly illustrate the technical solutions of the embodiments of the present disclosure, the accompanying drawings required to be used in the description of the embodiments are briefly described below. Obviously, the accompanying drawings in the following description are only some examples or embodiments of the present disclosure, and it is possible for a person of ordinary skill in the art to apply the present disclosure to other similar scenarios in accordance with these drawings without creative labor. Unless obviously obtained from the context or the context illustrates otherwise, the same numeral in the drawings refers to the same structure or operation.

It should be understood that the terms "system," "device," "unit" and/or "module" used herein are a way to distinguish between different components, elements, parts, sections, or assemblies at different levels. However, the terms may be replaced by other expressions if other words accomplish the same purpose.

As shown in the present disclosure and in the claims, unless the context clearly suggests an exception, the words "one," "a," "an," "one kind," and/or "the" do not refer specifically to the singular, but may also include the plural. Generally, the terms "including" and "comprising" suggest only the inclusion of clearly identified steps and elements, however, the steps and elements that do not constitute an exclusive list, and the method or apparatus may also include other steps or elements.

Flowcharts are used in the present disclosure to illustrate the operations performed by a system according to embodiments of the present disclosure, and the related descriptions are provided to aid in a better understanding of the magnetic resonance imaging method and/or system. It should be appreciated that the preceding or following operations are not necessarily performed in an exact sequence. Instead, steps can be processed in reverse order or simultaneously. Also, it is possible to add other operations to these processes or to remove a step or steps from these processes.

FIG. 1 is a schematic diagram illustrating a platform structure of an exemplary system for pipeline waste gas safety treatment of smart gas based on an IoT according to some embodiments of present disclosure. The system for pipeline waste gas safety treatment of smart gas based on the IoT (also referred to as a system 100) covered by the embodiments of the present disclosure will be described in detail below. It should be noted that the following embodiments are used only for explaining the present disclosure and do not constitute a limitation of the present disclosure.

In some embodiments, the system 100 may include a smart gas government safety supervision management platform 110, a smart gas government safety supervision sensor network platform 120, a smart gas government safety supervision object platform 130, a gas company sensor network platform 140, and a smart gas equipment object platform 150.

The smart gas government safety supervision management platform 110 is a comprehensive management platform for governmental departments to supervise a gas pipeline network and gas companies. In some embodiments, the smart gas government safety supervision management platform may be configured to supervise a process of gas pipeline waste gas treatment based on the IoT, and process and/or storage data related to the process of gas pipeline waste gas treatment. The data related to the process of gas pipeline waste gas treatment may include, but is not limited to, an environmental feature of a pending pipeline, a historical waste gas treatment time of the pending pipeline, a historical score corresponding to the pending pipeline, or the like.

The smart gas government safety supervision sensor network platform 120 is a platform for comprehensive management of government sensor information. In some embodiments, the smart gas government safety supervision sensor network platform 120 may be configured to realize functions of perceptual information sensing communication and control information sensing communication between the smart gas government safety supervision management platform 110 and the smart gas government safety supervision object platform 130.

The smart gas government safety supervision object platform 130 is a platform for government supervision information generation and control information execution. For example, the smart gas government safety supervision object platform 130 may be configured to obtain safety supervision demand information to make a government safety supervisor to perform safety supervision on a task related to the gas pipeline waste gas treatment.

In some embodiments, the smart gas government safety supervision object platform 130 may include a gas company management platform 131.

In some embodiments, the gas company management platform 131 may perform data interaction with the smart gas government safety supervision management platform 110 through the smart gas government safety supervision sensor network platform 120. For example, the gas company management platform 131 may obtain the environmental feature of the pending pipeline, the historical waste gas treatment time of the pending pipeline, the historical score corresponding to the pending pipeline, and other data from the smart gas government safety supervision management platform 110 through the smart gas government safety supervision sensor network platform 120.

In some embodiments, the gas company management platform 131 may include a communication module and a processor.

In some embodiments, the communication module may be used for communication and information transmission between various platforms and devices in the system 100 based on the IoT.

In some embodiments, the processor may implement the functions described in the present disclosure by processing information and/or data related to the system 100 based on the IoT.

The processor may be configured to collect, analyze, and process data, generate a corresponding control instruction based on the data, and send the control instruction to an actuator to make the actuator perform a corresponding action or function. For example, the control instruction may be sent to the communication module to make the communication module perform at least one of the functions of initiating, relating, obtaining data, transmitting data, or the like.

In some embodiments, the processor may determine, based on a waste gas treatment level of the pending pipeline, a waste gas emission standard for the pending pipeline; in response to determining that the pending pipeline begins to emit waste gas, obtain, through the gas company sensor network platform, an instant treatment parameter of a waste gas treatment device in the pending pipeline from the smart gas equipment object platform; determine, based on at least one of the waste gas emission standard, the instant treatment parameter, and a waste gas feature, an expected treatment parameter corresponding to a preset future time point; and generate, based on the expected treatment parameter, an adjustment instruction and send the adjustment instruction to the smart gas equipment object platform through the gas company sensor network platform to control the smart gas equipment object platform to adjust a treatment parameter of the waste gas treatment device based on the adjustment instruction. More descriptions may be found in the related descriptions of FIGS. 3-5 of the present disclosure.

By using the processor and the communication module, the functions of automatic data transmission, data processing, and automatic control can be realized, which improves the degree of automation of the system for pipeline waste gas safety treatment of smart gas based on the IoT, and improves the efficiency and accuracy of scheduling gas.

In some embodiments, the gas company management platform 131 may send an execution program including the treatment parameter of the waste gas treatment device to the smart gas government safety supervision management platform 110, and execute the execution program only when a confirmation instruction is received from the smart gas government safety supervision management platform 110.

The gas company sensor network platform 140 is a platform used for managing sensing communication. In some embodiments, the gas company sensor network platform 140 may perform information interaction with the gas company management platform 131 and the smart gas equipment object platform 150.

In some embodiments, the gas company sensor network platform 140 may implement the functions of perceptual information sensing communication and control information sensing communication.

The smart gas equipment object platform 150 is a functional platform for perceptual information generation and control information execution.

In some embodiments, the smart gas equipment object platform 150 may include at least the waste gas treatment device, a monitoring device, or the like.

In some embodiments, the smart gas equipment object platform 150 may perform bidirectional interaction with the gas company sensor network platform. For example, the smart gas equipment object platform 150 may receive, through the gas company sensor network platform 140, an adjustment instruction sent by the gas company management platform, and send the adjustment instruction to the waste gas treatment device to control the smart gas equipment object platform to adjust the treatment parameter of the waste gas treatment device based on the adjustment instruction.

According to some embodiments of the present disclosure, the system 100 for pipeline waste gas safety treatment of smart gas based on the IoT can form information communication between various platforms, and coordinate and regularize the operation under the unified management of the smart gas government safety supervision object platform to realize the intellectualization and standardization of the process of the gas pipeline waste gas treatment, and effective supervision of the process of the gas pipeline waste gas treatment, thereby avoid safety hazards.

It should be noted that the above description of the system and the platform is provided only for descriptive convenience, and does not limit the present disclosure to the scope of the cited embodiments. It should be understood that for a person skilled in the art, after understanding the principle of the system, it is possible to arbitrarily combine various modules or form a sub-system to connect with other modules without deviating from this principle.

Figure 2:
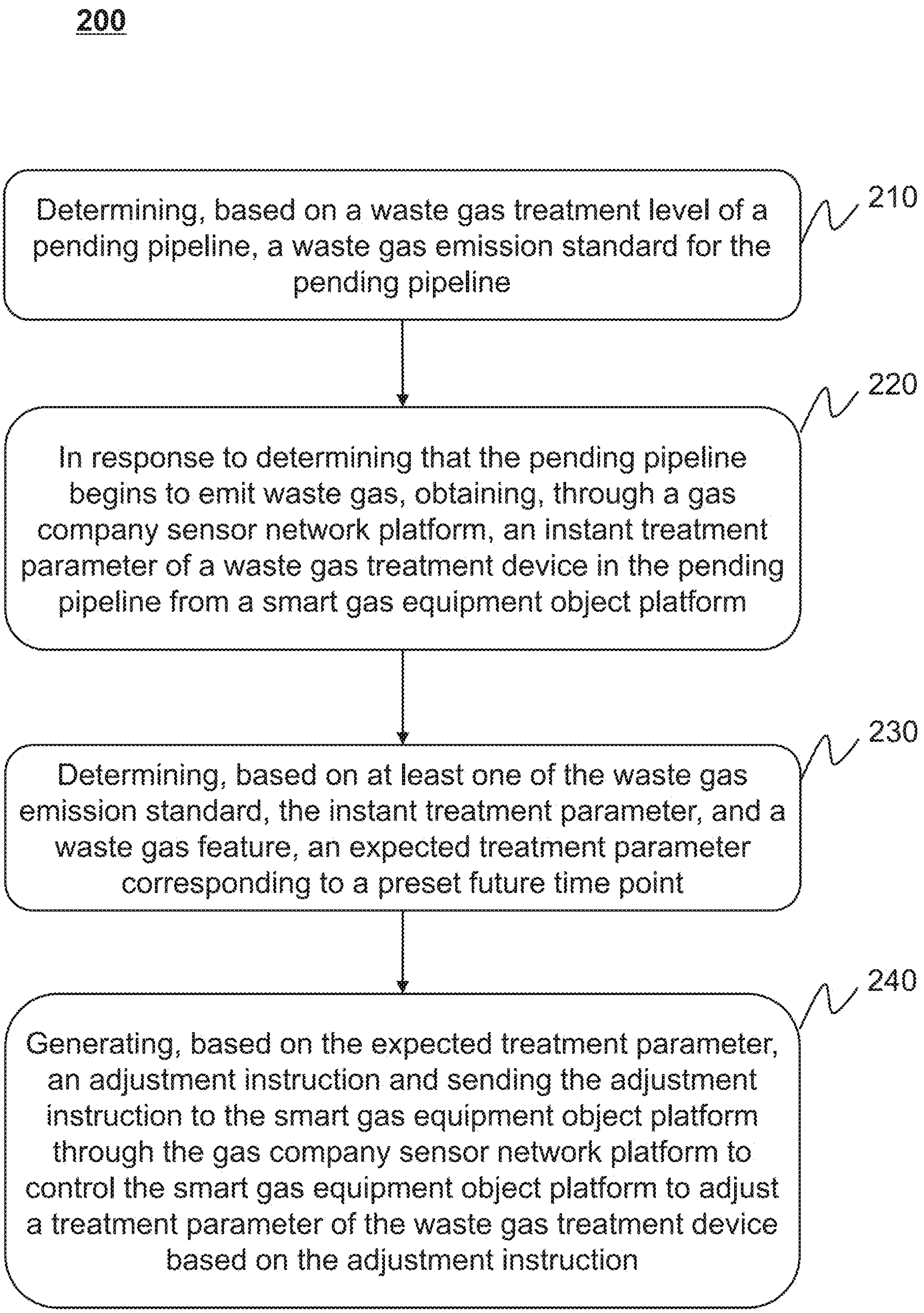
FIG. 2 is a flowchart illustrating an exemplary method for pipeline waste gas safety treatment of smart gas based on an IoT according to some embodiments of present disclosure.

FIG. 2 is a flowchart illustrating an exemplary method for pipeline waste gas safety treatment of smart gas based on an IoT according to some embodiments of present disclosure. As shown in FIG. 2, a process 200 may include the following operations. In some embodiments, the process 200 may be performed by a gas company management platform.

In 210, a waste gas emission standard for a pending pipeline may be determined based on a waste gas treatment level of the pending pipeline, The pending pipeline is a pipeline that requires gas treatment. The gas treatment may include discharging waste gas in the pipeline, treating the waste gas in the pipeline, or the like. The waste gas refers to a gas in the gas pipeline that needs to be discharged or treated.

The waste gas treatment level indicates an urgency of the need for waste gas treatment. The higher the waste gas treatment level, the higher the urgency that the pending pipeline needs the waste gas treatment as soon as possible, and the more necessary it is to complete the waste gas treatment as soon as possible.

In some embodiments, the waste gas treatment level may be determined based on reasons why the pending pipeline needs the waste gas treatment. In some embodiments, the reasons why the pending pipeline needs the waste gas treatment may include at least one of susceptibility to explosion, gas leakage, pipeline reconstruction, pressure adjustment, and emergency repair. The gas company management platform may assign corresponding weights to different reasons and determine, based on at least one of the reasons corresponding to the pending pipeline and a weight corresponding to the reason, a corresponding treatment assessment value corresponding to the pending pipeline through weighted summation; and determine, based on the treatment assessment value and a preset treatment level determination criterion, the waste gas treatment level corresponding to the pending pipeline.

In some embodiments, the reasons for the waste gas treatment corresponding to the pending pipeline may be determined based on user feedback. For example, the gas company management platform may obtain, through the smart gas government safety supervision sensor network platform, input data from a gas management user in the smart gas government safety supervision sensor network platform, to determine the reasons for the waste gas treatment corresponding to the pending pipeline.

In some embodiments, the weights corresponding to different reasons may be set based on prior experience and/or actual needs. For example, a weight range corresponding to emergencies such as the gas leakage, the emergency repair, etc. is a first preset range, and a weight range corresponding to non-emergencies such as the pipeline reconstruction, the pressure adjustment, etc. is a second preset range. The first preset range and the second preset range may be greater than 0, and a minimum value of the first preset range may not be less than a maximum value of the second preset range.

The preset treatment level determination criterion may be set based on at least one of prior experience, historical data, and actual needs.

In some embodiments, the preset treatment level determination criterion may be determined based on historical data of the waste gas treatment. For example, the gas company management platform may determine a historical assessment value corresponding to the pending pipeline in the historical data based on the weights and the reasons for the waste gas treatment corresponding to different waste gas operations in the historical data; determine an assessment value range based on maximum and minimum values of the historical assessment value, and uniformly divide the assessment value range into a plurality of levels, and determine the preset treatment level determination criterion based on the plurality of levels and assessment value ranges corresponding to different levels.

The waste gas emission standard refers to a limitation on a concentration and/or a total amount of waste gases discharged into the atmosphere. For example, the waste gas emission standard may include a maximum value of a concentration of each component of the waste gas discharged from the pending pipeline.

In some embodiments, the gas company management platform may determine the waste gas emission standard for the pending pipeline based on the waste gas treatment level of the pending pipeline through an emission standard reference table.

The emission standard reference table may include a reference waste gas treatment level and a reference emission standard corresponding to the reference waste gas treatment level. In some embodiments, the gas company management platform may determine the waste gas emission standard for the pending pipeline based on historical data that satisfies requirements. The historical data may be obtained based on the smart gas government safety supervision management platform. Merely by way of example, the gas company management platform may obtain target historical data that satisfies the requirements from the smart gas government safety supervision management platform through the smart gas government safety supervision sensor network platform, determine the reference waste gas treatment level based on a historical waste gas treatment level corresponding to the target historical data, and determine the reference emission standard based on a mean value of historical emission standards corresponding to at least one target historical data having the same historical waste gas treatment level. The historical data that satisfies the requirements means that a historical gas emission process corresponding to the historical data is not hazardous.

In some embodiments, the gas company management platform may determine, based on the waste gas treatment level of the pending pipeline, the waste gas emission standard for the pending pipeline through a preset rule. The preset rule may include waste gas emission standards corresponding to different waste gas treatment levels, which may be determined based on an input from a gas supervision user.

In 220, in response to determining that the pending pipeline begins to emit waste gas, an instant treatment parameter of a waste gas treatment device in the pending pipeline may be obtained from a smart gas equipment object platform through a gas company sensor network platform.

The waste gas treatment device is a device disposed in the gas pipeline to treat the waste gas in the gas pipeline. In some examples, the waste gas treatment device may include an induced draft fan, a filter device, a regulation valve, etc.

The induced draft fan may be configured to extract waste gases after combustion. In some embodiments, the gas company management platform may send an instruction to the smart gas equipment object platform through the gas company sensor network platform to adjust a speed of the induced draft fan, so as to control an emission rate of the waste gas.

The filter device may include a dust removal device, a desulfurization device, a denitrification device, and other devices configured to purify the waste gas.

The regulation valve is a valve provided in the gas pipeline. In some embodiments, the gas company management platform may send an instruction to the smart gas equipment object platform through the gas company sensor network platform to control an opening degree of the regulation valve, so as to control the emission rate of the gas in the pipeline.

The instant treatment parameter is a parameter that characterizes an operation efficiency of the waste gas treatment device at a current time.

In some embodiments, the gas company management platform may obtain the instant treatment parameter from the smart gas equipment object platform through the gas company sensor network platform. Merely by way of example, the smart gas equipment object platform may communicate with the waste gas treatment device to obtain the instant treatment parameter of the waste gas treatment device.

In 230, an expected treatment parameter corresponding to a preset future time point may be determined based on at least one of the waste gas emission standard, the instant treatment parameter, and a waste gas feature.

The waste gas feature may include components of the waste gas and a concentration of each component. In some embodiments, the waste gas feature may be represented in the form of a vector. The vector may include at least one element, each element of the at least one element characterizing a component of the waste gas and the concentration corresponding to the component.

In some embodiments, the gas company management platform may obtain the waste gas feature from the smart gas equipment object platform through the gas company sensor network platform. Merely by way of example, the smart gas equipment object platform may determine the waste gas feature through one or more sensors provided in the pending pipeline.

The preset future time point is a preset time for a scheduled adjustment to the operation efficiency of the waste gas treatment device.

In some embodiments, the preset future time point may be set based on prior experience and/or actual needs.

The expected treatment parameter indicates the operation efficiency of the waste gas treatment device after the adjustment.

In some embodiments, the gas company management platform may determine the expected treatment parameter corresponding to the preset future time point based on at least one of the waste gas emission standard, the instant treatment parameter, and the waste gas feature. Merely by way of example, the gas company management platform may determine the expected treatment parameter based on at least one of the waste gas emission standard, the instant treatment parameter, and the waste gas feature by querying a reference treatment parameter table. The reference treatment parameter table may include a reference feature and a reference treatment parameter corresponding to the reference feature. In some embodiments, the gas company management platform may obtain a suggested treatment parameter input by the user and determine the suggested processing parameter as the expected treatment parameter.

In some embodiments, the gas company management platform may determine a standard treatment efficiency based on the waste gas emission standard, the instant treatment parameter, and the waste gas features, determine a target treatment efficiency based on the standard treatment efficiency and an environmental feature of the pending pipeline, and determine the expected treatment parameter corresponding to the preset future time point based on the target treatment efficiency. More descriptions may be found in FIG. 3 and the related descriptions thereof.

In some embodiments, the gas company management platform may assess, based on at least one of the pipeline feature of the pending pipeline, the instant treatment parameters, a historical environmental feature during a preset historical time period, and a historical waste gas feature, an emission risk of waste gas emission from the pending pipeline through a risk assessment model; and in response to determining that the emission risk does not satisfy a safety condition, determine the expected treatment parameter corresponding to the preset future time point. More descriptions may be found in FIG. 5 and the related descriptions thereof.

In 240, an adjustment instruction may be generated based on the expected treatment parameter, and the adjustment instruction may be sent to the smart gas equipment object platform through the gas company sensor network platform to control the smart gas equipment object platform to adjust a treatment parameter of the waste gas treatment device based on the adjustment instruction.

The adjustment instruction is an instruction for adjusting a count and the operation efficiency of the waste gas treatment device.

In some embodiments, the gas company management platform may generate the adjustment instruction based on the expected treatment parameter. For example, if the expected treatment parameter is $\{(D_1, P_1), \ldots, (D_n, P_n)\}$, the adjustment instruction is determined as "adjust each waste gas treatment device in the pending pipeline based on the expected treatment parameter $\{(D_1, P_1), \ldots, (D_n, P_n)\}$". Where $(D_n, P_n)$ denotes a treatment parameter of an nth waste gas treatment device in the pending pipeline, and $D_n$ denotes an on state of the nth waste gas treatment device. The on state may be expressed by 1 or 0, where 1 denotes on, and 0 denotes off. $P_n$ denotes an efficiency of the nth waste gas treatment device.

In some embodiments, the gas company management platform may send the adjustment instruction to the smart gas equipment object platform through the gas company sensor network platform; and the smart gas equipment object platform may control at least one waste gas treatment device in the pending pipeline based on the adjustment instruction, and adjust the treatment parameter of the at least one waste gas treatment device based on the expected treatment parameter included in the adjustment instruction.

In some embodiments of the present disclosure, the expected treatment parameter is determined based on at least one of the waste gas emission standard of the pending pipeline, the instant treatment parameter, and the waste gas feature, which fully considers the current situation of the waste gas treatment and the waste gas feature, and is conducive to determining a more appropriate treatment parameter based on the actual treatment situation, thereby ensuring that the waste gas treatment effect is achieved and the waste gas emission standard is achieved more efficiently and accurately.

It should be noted that the foregoing description of the process 200 is intended to be exemplary and illustrative only and does not limit the scope of application of the present disclosure. For a person skilled in the art, various corrections and changes can be made to the process 200 under the guidance of the present disclosure. However, these corrections and changes remain within the scope of the present disclosure.

Figure 3:
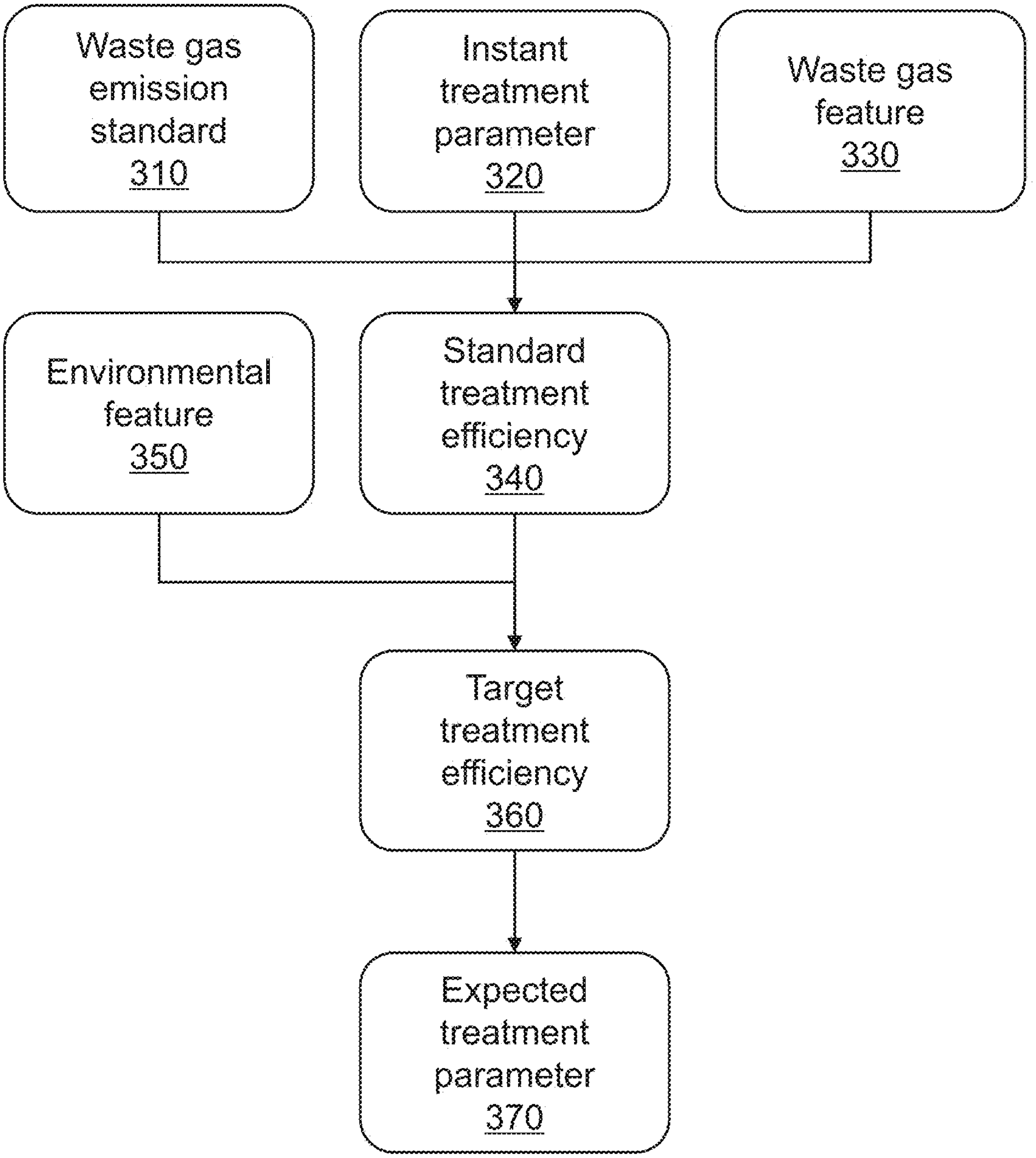
FIG. 3 is a schematic diagram illustrating a process of determining an expected treatment parameter based on an expected treatment efficiency according to some embodiments of present disclosure.

FIG. 3 is a schematic diagram illustrating a process of determining an expected treatment parameter based on an expected treatment efficiency according to some embodiments of present disclosure. The process of determining the expected treatment parameter based on the expected treatment efficiency may include the following content, as shown in FIG. 3. In some embodiments, the process of determining then expected treatment parameter based on the expected treatment efficiency may be performed by a processor of a gas company management platform.

In some embodiments, the gas company management platform may determine, based on a waste gas emission standard 310, an instant treatment parameter 320, and a waste gas feature 330, a standard treatment efficiency 340; determine, based on an environmental feature 350 and the standard treatment efficiency 340, a target treatment efficiency 360; and determine, based on the target treatment efficiency 360, an expected treatment parameter 370 corresponding to a preset future time point.

More descriptions regarding the waste gas emission standard, the instant treatment parameter, and the waste gas feature may be found in FIG. 2 and the related descriptions thereof.

The standard treatment efficiency is used to characterize actual emission of a waste gas from a pending pipeline per unit of time. For example, when the standard treatment efficiency is 500 $m^3/h$, it means that a waste gas treatment device in the pending pipeline can actually treat 500 cubic meters of waste gas per hour.

In some embodiments, the gas company management platform may determine the standard treatment efficiency based on the waste gas emission standard, the instant treatment parameter, and the waste gas feature in various ways.

In some embodiments, the waste gas emission standard may include a maximum value of a concentration of each component in the waste gas. The instant treatment parameter may include a count of waste gas treatment devices that perform waste gas treatment in the pending pipeline and current operation efficiencies of the corresponding waste gas treatment devices. The waste gas feature may include the concentration of each component in the waste gas. More descriptions regarding the waste gas emission standard, the instant treatment parameter, and the waste gas feature may be found in FIG. 2 and the related descriptions thereof.

In some embodiments, the gas company management platform may determine the standard treatment efficiency of the pending pipeline based on a relationship that the standard treatment efficiency of the pending pipeline is positively correlated with a standard operation efficiency of each waste gas treatment device, and negatively correlated with a maximum threshold of the concentration of each component in the waste gas and the concentration of each component in the waste gas through the following equation (1).

$$Q = \sum_1^n Q_i * (C_1 - C_2) / C_1 \tag{1}$$

Where, Q denotes the standard treatment efficiency of the pending pipeline, $Q_i*(C_1-C_2)/C_1$ denotes the waste gas emission per unit time of an ith waste gas treatment device in the pending pipeline, $Q_i$ denotes the standard operation efficiency corresponding to the ith waste gas treatment device, $C_1$ denotes an inlet concentration of each component in the waste gas in the pending pipeline, and $C_2$ denotes the maximum threshold of the concentration of each component in the waste gas in the waste gas emission standard of the pending pipeline.

The standard operation efficiency characterizes an ability of the waste gas treatment device in the pending pipeline to treat the waste gas. For example, the standard operation efficiency of the waste gas treatment device is characterized in terms of a volume of waste gas treated per unit of time. In some embodiments, the standard operation efficiency of the waste gas treatment device may be determined based on specifications of the waste gas treatment device. In some embodiments, the standard operation efficiencies of at least one waste gas treatment device may be different.

The environmental feature is a feature that characterizes the surroundings of the pending pipeline. For example, the environmental feature may include, but is not limited to, at least one of a flow of people, a traffic congestion index, and air mobility around the pending pipeline. In some embodiments, the environmental feature may be represented in the form of a vector, and the elements in the vector may include at least one of the flow of people, the traffic congestion index, and the air mobility around the pending pipeline.

In some embodiments, the gas company management platform may obtain the environmental feature of the pending pipeline from the smart gas government safety supervision management platform. For example, the smart gas government safety supervision management platform may collect the flow of people, the traffic congestion index, and the air mobility around the pending pipeline through one or more sensors, cameras, and other devices, and transmit the flow of people, the traffic congestion index, and the air mobility around the pending pipeline to the gas company management platform.

The flow of people is a count of pedestrians passing round the pending pipeline per unit of time. For example, 200 pedestrians pass round the pending pipeline per hour. In some embodiments, a region ground the pending pipeline may be limited by those skilled in the art or the system by default. Merely by way of example, the region ground the pending pipeline may be a region of 100 square meters near the pending pipeline, etc., which may be set based on prior experience and/or actual needs.

The traffic congestion index is a numerical value used to characterize a degree of traffic congestion on roads surrounding the pending pipeline. For example, the traffic congestion index is a numerical value ranging from 0 to 100, and the larger the numerical value, the higher the degree of traffic congestion.

The air mobility is data related to a rate of air flow around the pending pipeline. For example, the air mobility around the pending pipeline is a wind speed of 2 m/s, a wind direction is northeast, etc.

The target treatment efficiency is a value that characterizes a volume of waste gas emission per unit of time that is expected to be achieved by the pending pipeline after adjustment of the standard treatment efficiency.

In some embodiments, the treatment efficiency of the waste gas treatment device varies with the influence of environmental factors and a state of the waste gas treatment device. The target treatment efficiency is determined such that the process of the treatment better adapts to the actual environment, thereby improving the ability and efficiency of the system for the waste gas treatment.

In some embodiments, the gas company management platform may determine the target treatment efficiency based on the environmental feature and the standard treatment efficiency. Merely by way of example, the gas company management platform may determine an adjustment amount based on a vector distance between the environmental feature and a standard environmental feature, and a weighted sum of sub-parameters (e.g., the flow of people, the traffic congestion index, the air mobility around the pending pipeline, etc.) in the environmental feature; and determine the target treatment efficiency by adjusting the standard treatment efficiency based on the adjustment amount. The vector distance may be determined based on a cosine distance between the environmental feature and the standard environmental feature.

In some embodiments, the target treatment efficiency may be positively correlated with the standard treatment efficiency. Merely by way of example, the gas company management platform may determine the target treatment efficiency based on following equation (2).

$$P = X * \left(1 + \frac{D}{k_1 * m + k_2 * n - k_3 * r}\right) \tag{2}$$

Where P denotes the target treatment efficiency of the pending pipeline, X denotes the standard treatment efficiency of the pending pipeline, D denotes the cosine distance between the environmental feature and the standard environmental feature, m denotes the flow of people around the pending pipeline in the environmental feature, n denotes the traffic congestion index around the pending pipeline in the environmental feature, r denotes the air mobility around the pending pipeline in the environmental feature, and $k_1$, $k_2$, and $k_3$ denote weight coefficients of the flow of people, the traffic congestion index, and the air mobility, respectively.

In some embodiments, the weight coefficients of the flow of people, the traffic congestion index, and the air mobility may be determined based on prior experience. In some embodiments, the greater the impact of a sub-parameter in the environmental feature on the waste gas treatment, the greater the corresponding weight coefficient. Merely by way of example, the impact of the air mobility on the diffusion of the waste gas emission may be greater than the impact of the flow of people and the traffic congestion index. Accordingly, the weight coefficient of the air mobility may be greater than the weight coefficients of the flow of people and the traffic congestion index around the pending pipeline.

The standard environmental feature is a parameter related to a surrounding environment of the pending pipeline under a standard condition. For example, the standard environmental feature may include, but is not limited to, a flow of people, a traffic congestion index, and air mobility under the standard condition. In some embodiments, the standard environmental feature may be represented in the form of a vector, and the vector may include elements such as the flow of people, the traffic congestion index, and the air mobility under the standard condition.

The standard condition refers to an ideal setting of an environmental feature parameter around the pending pipeline in a specific environment. For example, the standard condition may be a situation such as ideal weather, no unusual event occurring, normal operation of equipment, etc.

In some embodiments, the gas company management platform may determine the standard environmental feature by the following operations.

S1, a collection of historical environmental features of the pending pipeline may be obtained. Each environmental feature in the collection of the historical environmental features may include a plurality of sub-parameters, such as the flow of people, the traffic congestion index, the air mobility around the pending pipeline, etc.

S2, the collection of historical environmental features may be clustered based on each sub-parameter (e.g., the flow of people, the traffic congestion index, and the air mobility) to obtain a plurality of clusters A1, A2, A3, . . . clustered by based on the flow of people, a plurality of clusters B1, B2, B3, . . . clustered based on the traffic congestion index, and a plurality of clusters C1, C2, C3, . . . clustered based on the air mobility. In some embodiments, various types of clustering algorithms may be provided. For example, the clustering algorithms may include K-means clustering, density-based spatial clustering of applications with noise (DBSCAN), etc.

S3, for a plurality of clusters obtained by clustering based on each sub-parameter in the collection of historical environmental features, a mean value of the sub-parameter in the corresponding cluster may be calculated to obtain a plurality of mean values of the flow of people, a plurality of mean values of the traffic congestion index, and a plurality of mean values of the air mobility in the collection of historical environmental features, respectively.

S4, a weighted sum of the mean values of each sub-parameter in the collection of historical environmental features obtained by the operation S3 may be calculated to obtain a weighted sum of the flow of people, a weighted sum of the traffic congestion index, and a weighted sum of the air mobility in the collection of historical environmental features.

For example, taking the flow of people in the collection of historical environmental features as an example, the gas company management platform may determine the weighted sum corresponding to the sub-parameter based on a relationship that the weighted sum of each sub-parameter is positively correlated with the mean value of each cluster of each sub-parameter by the following equation (3).

$$S = K_{s1} * x_{s1} + K_{s2} * x_{s2} + \cdots\ldots\ldots + K_{sn} * x_{sn} \quad (3)$$

Where S denotes the weighted sum of the flow of people, $x_{si}$ denotes the mean value of the flow of people in each cluster, and $K_{si}$ denotes the weight coefficient of the mean value of the flow of people corresponding to a cluster i.

In some embodiments, the weight coefficient $K_{si}$ of the cluster i is a result obtained by dividing a count of environmental features in the cluster i by a size of the collection of historical environmental features.

In some embodiments, the weighted sum of the traffic congestion index and the air mobility, and the calculation of the weights may be determined in a similar manner.

In some embodiments, the weight for the weighting of each mean value of each sub-parameter is a result obtained by dividing the count of environmental features of the cluster corresponding to the sub-parameter by a total count of environmental features in the collection of historical environmental features.

S5, the gas company management platform may determine the standard environmental feature based on the weighted sum of the sub-parameters determined by the operation S4.

For example, the weighted sum of the flow of people obtained by the operation S4 may be used as the flow of people in the standard environmental feature, the weighted sum of the traffic congestion index may be used as the traffic congestion index in the standard environmental feature, and the weighted sum of the air mobility may be used as the air mobility in the standard environmental feature, such that the standard environmental feature of the pending pipeline may be obtained.

For example, taking the calculation of the flow of people of the standard environmental feature as an example, assuming that there are a plurality of environmental features in the collection of historical environmental features, the flow of people in the collection of historical environmental feature is clustered to obtain a cluster A1, a cluster A2, and a cluster A3. Then a mean value a1 of the flow of people in the environmental feature in the cluster A1, a mean value a2 of the flow of people in the environmental feature in the cluster A2, and a mean value a3 of the flow of people in the environmental feature in the cluster A3 are calculated, respectively. The weighted sum of the flow of people in the collection of the historical environmental features is obtained as the flow of people in the standard environmental feature by using the equation (3). In some embodiments, the traffic congestion index and the air mobility in the standard environmental feature may be obtained in the same manner as the calculation of the flow of people, which may be found in the related descriptions above.

The collection of historical environmental features is a collection consisting of environmental features at a plurality of moments in historical data. For example, the collection of historical environmental features may be represented by {X1, X2, . . . , Xi, . . . Xn}. Where Xi denotes an environmental feature corresponding to an ith moment.

In some embodiments, the gas company management platform may uniformly increase the operation efficiency (e.g., increase the speed of the induced draft fan, increase the opening of the regulation valve, and increase the power of the filter device) of each waste gas treatment device up to a maximum power (or a maximum speed, or a maximum opening degree). If the current treatment efficiency of the waste gas is still less than the target treatment efficiency, a count of the waste gas treatment device in operation may be increased (e.g., increase the count of the induced draft fan or the count of the filter device), so as to obtain the expected treatment parameter.

In some embodiments, in response to determining that the pending pipeline begins to emit the waste gas, the gas company management platform may obtain, based on a data acquisition cycle, a monitoring parameter sequence of the pending pipeline during a preset historical time period from the smart gas equipment object platform through the gas company sensor network platform.

The data acquisition cycle is a frequency of periodically acquiring data from the smart gas equipment object platform at a preset interval. For example, the data acquisition cycle is 1 day, 1 hour, etc.

In some embodiments, the data acquisition cycle may be determined in various ways. For example, the data acquisition cycle is set based on prior experience and/or actual needs.

In some embodiments, the data acquisition cycle may be correlated with the target treatment efficiency.

In some embodiments, the data acquisition cycle may be negatively correlated with the target treatment efficiency of the current pending pipeline.

According to some embodiments of the present disclosure, a higher waste gas emission efficiency means a higher count of waste gas treatment device, a higher operation efficiency, and a more severe change in the concentration of the waste gas. When the waste gas treatment device has a fault, the fault may have a great impact. Accordingly, by appropriately shortening the interval of the data acquisition cycle, it helps to take measures in time when the risk elevates.

The preset historical time period is a preset range of historical time period that is projected backward from the current moment. For example, the preset historical time period may be a historical time period of 1 week, 1 month, etc. from the current moment.

In some embodiments, the preset historical time period may be set based on prior experience and/or actual needs.

The monitoring parameter is a parameter used to reflect an operation state and safety of the pending pipeline. For example, the monitoring parameter may include, but is not limited to, at least one of a temperature, a pressure, and a gas flow rate within the pending pipeline.

The monitoring parameter sequence is a sequence consisting of monitoring parameters at a plurality of moments. For example, the monitoring parameter sequence may be represented by $\{(t_1, Y_1), (t_2, Y_2), \ldots, (t_i, Y_i), \ldots, (t_n, Y_n)\}$. Where $Y_i$ denotes a monitoring parameter corresponding to a moment ti.

In some embodiments, the gas company management platform may obtain the monitoring parameter from a temperature sensor, a pressure sensor, a flow sensor, etc. in the smart gas equipment object platform through the gas company sensor network platform.

In some embodiments, in response to determining that the monitoring parameter sequence does not satisfy a preset condition, the gas company management platform may predict a remaining treatment time.

The preset condition is a condition used to determine that a parameter in the monitoring parameter sequence is below a safety condition. For example, the preset condition is that the temperature, the pressure, and the gas flow rate within the pending pipeline in the monitoring parameter sequence are below a threshold. In some embodiments, the threshold may be set by those skilled in the art or the system by default.

The remaining treatment time is an amount of time that the pending pipeline still needs the waste gas treatment, such as 10 min, and so on.

In some embodiments, the gas company management platform may determine the remaining treatment time based on a waste gas emission time and historical data. For example, the gas company management platform may obtain an average time for the waste gas treatment of the pending pipeline from the historical data, determine an estimate of time used for the waste gas treatment of the pending pipeline, and determine the remaining treatment time based on the estimate of time used for the waste gas treatment and the waste gas emission time.

In some embodiments, in response to determining that the pending pipeline begins to emit the waste gas, the gas company management platform may obtain the monitoring parameter sequence of the pending pipeline during the preset historical time period from the smart gas equipment object platform through the gas company sensor network platform; in response to determining that the monitoring parameter sequence does not satisfy a preset condition, predict the remaining treatment time. More descriptions may be found in FIG. 4 and the related descriptions thereof.

In some embodiments, the gas company management platform may determine the expected treatment efficiency by updating the target treatment efficiency based on the wage gas emission time, the remaining treatment time, and the environmental feature.

The waste gas emission time is a duration of the waste gas emission.

The expected treatment efficiency is data after the target treatment efficiency is updated.

In some embodiments, in response to determining that the remaining treatment time is greater than a difference between a duration threshold and the waste gas emission time, the gas company management platform may construct a vector to be matched based on the environmental feature of the pending pipeline. A waste gas treatment efficiency of the pending pipeline may be determined by matching in a treatment efficiency reference database based on the vector to be matched, and the waste gas treatment efficiency may be determined as the expected treatment efficiency of the pending pipeline.

The treatment efficiency reference database is a database for determining the waste gas treatment efficiency. The treatment efficiency reference database may include at least one reference scenario feature vector and a reference waste gas treatment efficiency corresponding to the reference scenario feature vector.

In some embodiments, the at least one reference vector in the treatment efficiency reference database may be determined based on historical data. For example, the gas company management platform may construct historical vectors based on historical environmental parameters of the pending pipeline in the historical data, cluster the historical vectors to form a preset count of cluster centers, and construct the reference vector based on the historical environmental features corresponding to the cluster centers. The reference waste gas treatment efficiency corresponding to the reference vector may be determined based on historical waste gas treatment efficiencies.

In some embodiments, the gas company management platform may obtain from actual waste gas emission times corresponding to a plurality of historical vectors in each cluster from the smart gas government safety supervision management platform. Waste gas treatment efficiencies corresponding to emission projects that have no emission accident and have the shortest emission time among waste gas treatment processes corresponding to the plurality of historical vectors in the cluster may be determined as the historical waste gas treatment efficiencies.

In some embodiments, the gas company management platform may calculate a similarity between the vector to be matched and at least one reference vector, and take a reference collection parameter corresponding to a reference vector with the highest similarity to the vector to be matched as the waste gas treatment efficiency. The similarity may be negatively correlated with a vector distance between the vector to be matched and the reference vector. The vector distance may be determined based on a cosine distance.

The duration threshold is a value used to determine whether the remaining treatment time is too long. More descriptions regarding the duration threshold may be found in FIG. 4 and the related descriptions thereof.

The waste gas treatment efficiency is a maximum volume of the waste gas treatment per unit of time of the pending pipeline.

In some embodiments, in response to determining that the remaining treatment time is less than or equal to the difference between the duration threshold and the waste gas emission time, then the gas company management platform may use the current target treatment efficiency as the expected treatment efficiency.

In some embodiments of the present disclosure, when the remaining treatment time is less than or equal to the duration threshold, it indicates that the waste gas emission is not carried out according to a predicted treatment efficiency. In this case, the waste gas emission efficiency needs to be adjusted in time to complete the waste gas treatment during a specified time.

In some embodiments, the gas company management platform may determine, based on the expected treatment efficiency, the expected treatment parameter corresponding to the preset future time point.

In some embodiments, in response to determining that an emission risk of waste gas emission from the pending pipeline satisfies a safety condition, the gas company management platform may adjust the expected treatment parameter.

The emission risk is a numerical value used to characterize a risk that exists during the waste gas treatment. For example, the higher the numerical value, the higher the emission risk of the pending pipeline. More descriptions regarding determining the emission risk may be found in FIG. 5 and the related descriptions thereof.

The safety condition is condition used to determine whether the waste gas emission is safe. For example, the safety condition may include that the emission risk is not greater than a risk threshold.

The risk threshold is a threshold used to determine whether the emission risk is too high. More descriptions regarding determining the risk threshold may be found in FIG. 5 and the related descriptions thereof.

In some embodiments, the gas company management platform may adjust the expected treatment parameter if the emission risk is below the risk threshold. For example, the gas company management platform may uniformly increase the operation efficiency of each waste gas treatment device (e.g., increase the speed of the induced draft fan, increase the opening degree of the regulation valve, and increase the power of the filter device) up to a maximum power (or a maximum speed, or a maximum opening degree). If the current waste gas treatment efficiency is still less than the target treatment efficiency, the gas company management platform may increase the count of the waste gas treatment device in operation (e.g., increase the count of the induced draft fan or the count of the filter device).

In some embodiments of the present disclosure, when the emission risk is high, it helps to ensure the safety of the waste gas treatment by prioritizing the control of the risk of the waste gas emission before considering the efficiency of the waste gas emission.

In some embodiments of the present disclosure, with the cooperation of the gas company management platform and the sensor network platform, the system can obtain the historical monitoring parameter sequence from the smart gas equipment object platform based on the data acquisition cycle when the pending pipeline begins to emit the waste gas, and predict the remaining treatment time when the monitoring parameter does not satisfy the preset condition. The system can determine the expected treatment efficiency by updating the target treatment efficiency based on the waste gas emission time, the remaining treatment time, and the environmental feature, and determine the expected treatment parameter corresponding to the preset future time point based on the expected treatment efficiency, thereby further enhancing the accuracy and real-time performance of the waste gas treatment and optimizing the overall efficiency of the waste gas treatment.

In some embodiments of the present disclosure, with the collaborative operation of the gas company management platform and the gas government safety supervision sensor network platform, the system can determine the standard treatment efficiency based on the waste gas emission standard, the instant treatment parameter, and the waste gas feature, and obtain the environmental feature of the pending pipeline from the smart gas government safety supervision management platform. By determining the target treatment efficiency by synthesizing the environmental feature and the standard treatment efficiency, and determining the expected treatment parameter corresponding to the preset future time point, the system based on the target treatment efficiency, the accuracy and reliability of the waste gas treatment process can be effectively improved, thereby ensuring that the system can maintain an efficient and safe waste gas treatment level under all environmental conditions.

Figure 4:
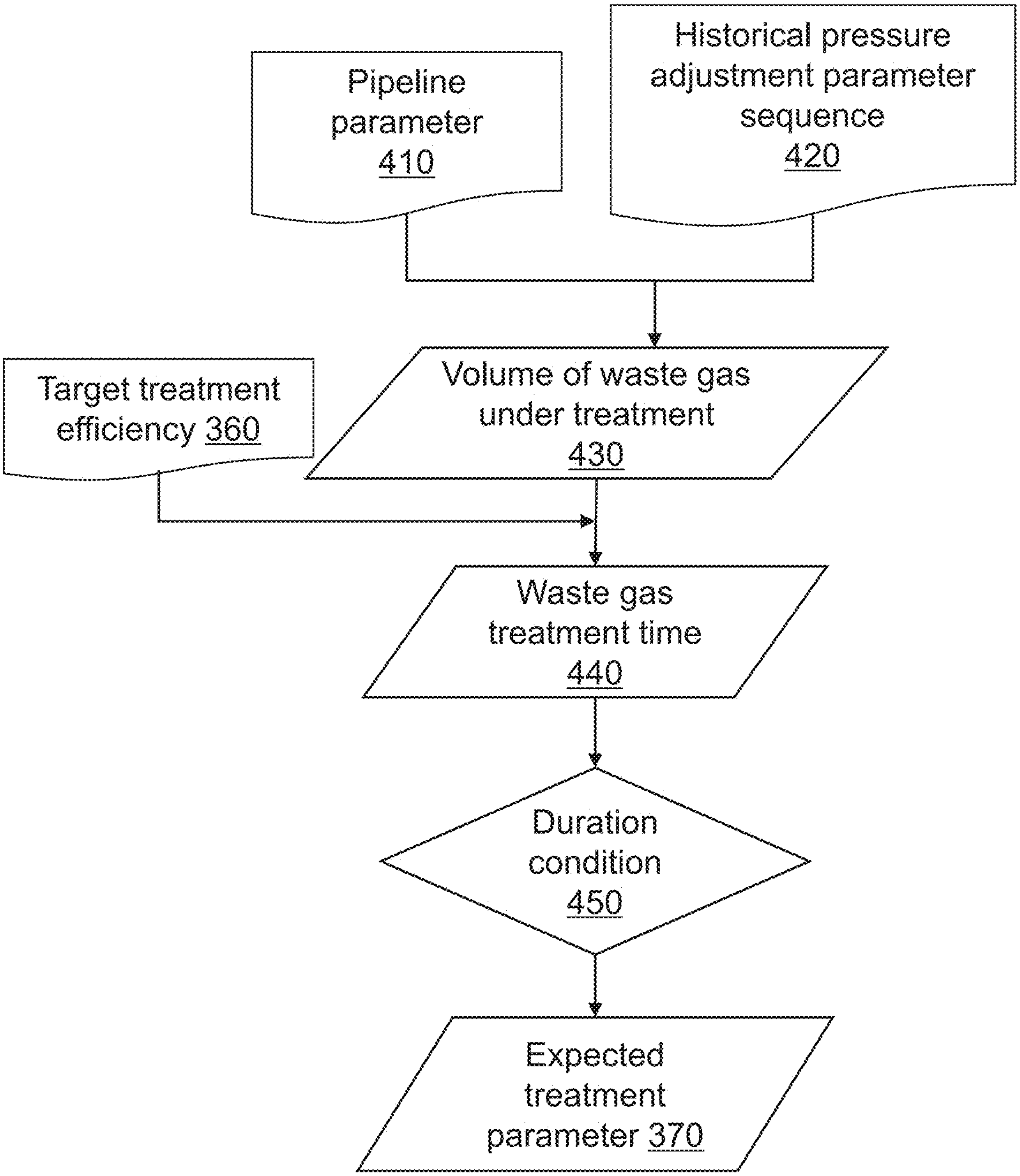
FIG. 4 is a schematic diagram illustrating a process of determining an expected treatment parameter based on a waste gas treatment time according to some embodiments of present disclosure.

FIG. 4 is a schematic diagram illustrating a process of determining an expected treatment parameter based on a waste gas treatment time according to some embodiments of present disclosure. The process of determining the expected treatment parameter based on the waste gas treatment time may include the following content, as shown in FIG. 4. In some embodiments, the process of determining the expected treatment parameter based on the waste gas treatment time may be performed by a processor of a gas company management platform.

In some embodiments, the gas company management platform may determine, based on a pipeline parameter 410 and a historical pressure adjustment parameter sequence 420, a volume of waste gas under treatment 430; determine, based on the volume of waste gas under treatment 430 and a target treatment efficiency 360, a waste gas treatment time 440; and in response to determining that the waste gas treatment time 440 does not satisfy a duration condition 450, determine an expected treatment parameter 370 corresponding to a preset future time point.

The pipeline parameter is a parameter that describe characteristics of a pipeline and related situations. For example, the pipeline parameter may include at least one of a diameter of the pipeline, a temperature inside the pipeline, and a flow rate of gas inside the pipeline. The temperature inside the pipeline and the flow rate of gas inside the pipeline may be obtained based on one or more sensors, and the diameter of the pipeline may be obtained based on a specification parameter of the pending pipeline.

The historical pressure adjustment parameter sequence characterizes pressures of the pending pipeline at a plurality of historical moments before and after pressure adjustment.

In some embodiments, the gas company management platform may obtain pipeline parameter of the pending pipeline, and the historical pressure adjustment parameter sequence during a preset historical time period from the smart gas object platform through the gas company sensor network platform.

The preset historical time period refers to a time period from a historical moment to a current moment, which may be set based on prior experience and/or actual needs.

The volume of waste gas under treatment is a volume of waste gas in the pipeline that needs to be treated.

In some embodiments, the gas company management platform may determine the volume of waste gas under treatment based on the pipeline parameter of the pending pipeline and the historical pressure adjustment parameter sequence by querying a reference database.

In some embodiments, the reference database may include a reference feature vector and a reference waste gas volume corresponding to the reference feature vector. The reference feature vector may be constructed based on historical pipeline parameters of a plurality of historical pending pipeline and the historical pressure adjustment parameter sequence in the historical data. The reference waste gas volume may be determined based on actual waste gas volumes of the plurality of historical pending pipelines.

In some embodiments, the processor may construct a vector to be matched based on the pipeline parameter of the pending pipeline and the pressure adjustment parameter sequence, and based on the to-be-matched vector, and determining a reference feature vector with the highest similarity to the vector to be matched as a target vector by matching the vector to be matched in a reference database; and determine a reference waste gas volume corresponding to the target vector as the volume of waste gas under treatment. The similarity may be calculated based on a cosine distance, a Euclidean distance, or the like.

In some embodiments, the gas company management platform may determine at least one reference feature vector that has a similarity to the vector to be matched higher than a similarity threshold, and take a mean value of the reference waste gas volume corresponding to the at least one reference feature vector as the volume of waste gas under treatment corresponding to the vector to be matched.

The waste gas treatment time is a duration required for the waste gas treatment in the pipeline. In some embodiments, the waste gas treatment time may be determined based on the volume of waste gas under treatment and a target waste gas treatment efficiency.

In some embodiments, the gas company management platform may determine the waste gas treatment time based on the volume of waste gas under treatment and the target waste gas treatment efficiency. Merely by way of example, the waste gas treatment time may be positively correlated with the volume of waste gas under treatment and negatively correlated with the target waste gas treatment efficiency. The gas company management platform may determine the waste gas treatment time by the following equation (4):

$$T = V/P \tag{4}$$

where T denotes the waste gas treatment time; V denotes the volume of waste gas under treatment; and P denotes the target waste gas treatment efficiency.

In some embodiments, in response to determining that the waste gas treatment time does not satisfy a duration condition, the gas company management platform may determine an expected treatment parameter corresponding to a preset future time point.

In some embodiments, the duration condition may include a duration threshold. For example, the duration condition may be that the waste gas treatment time is not greater than the duration threshold. The duration threshold is a set maximum value of the waste gas treatment time.

In some embodiments, the duration threshold may be determined based on prior experience and/or actual needs.

In some embodiments, the gas company management platform may determine, based on a historical waste gas treatment time and a historical score, the duration threshold.

The historical waste gas treatment time is an amount of time spent on the historical waste gas treatment process.

The historical score characterizes an evaluation of the historical waste gas treatment process. The higher the historical score, the better the effect of the waste gas treatment based on the historical waste gas treatment time.

In some embodiments, the gas company management platform may obtain, through the smart gas government safety supervision sensor network platform, a historical waste gas treatment time and a historical score corresponding to the pending pipeline from the smart gas government safety supervision management platform.

In some embodiments, the gas company management platform may determine a reference waste gas treatment time by screening the historical waste gas treatment time based on the historical score. For example, a historical waste gas treatment time of which a historical score does not satisfy a score requirement is excluded, such as a historical waste gas treatment time of which a historical score is less than a minimum threshold, a historical ranking is in the bottom 30% based on a descending order of the historical score, etc.

In some embodiments, the gas company management platform may determine a mean value of the reference waste gas treatment time as the duration threshold.

In some embodiments, the duration threshold is determined based on the historical waste gas treatment time and the historical score, which makes the setting of indexes more in line with actual needs, and make the waste gas treatment achieve the expected goal of satisfying the requirements, thereby realizing effective management of the waste gas treatment and effective cost control, and avoiding unnecessary input or unqualified treatment.

In some embodiments, the processor may uniformly increase the operation efficiency of the each waste gas treatment device (e.g., increase the speed of the induced draft fan, and increase the power of the filter device) until a rated power is reached; and if the current waste gas treatment time is still greater than the duration threshold, increase the count of the waste gas treatment device (e.g., increase the count of the induced draft fan or increase the count of the filter device, etc.).

In some embodiments, the expected treatment parameter corresponding to the preset future time point is determined, which helps in processing the waste gas in the pipeline in time by advance planning and resource deployment, improves the efficiency and accuracy of the treatment, and ensures that the process of the waste gas treatment is orderly and controllable.

Figure 5:
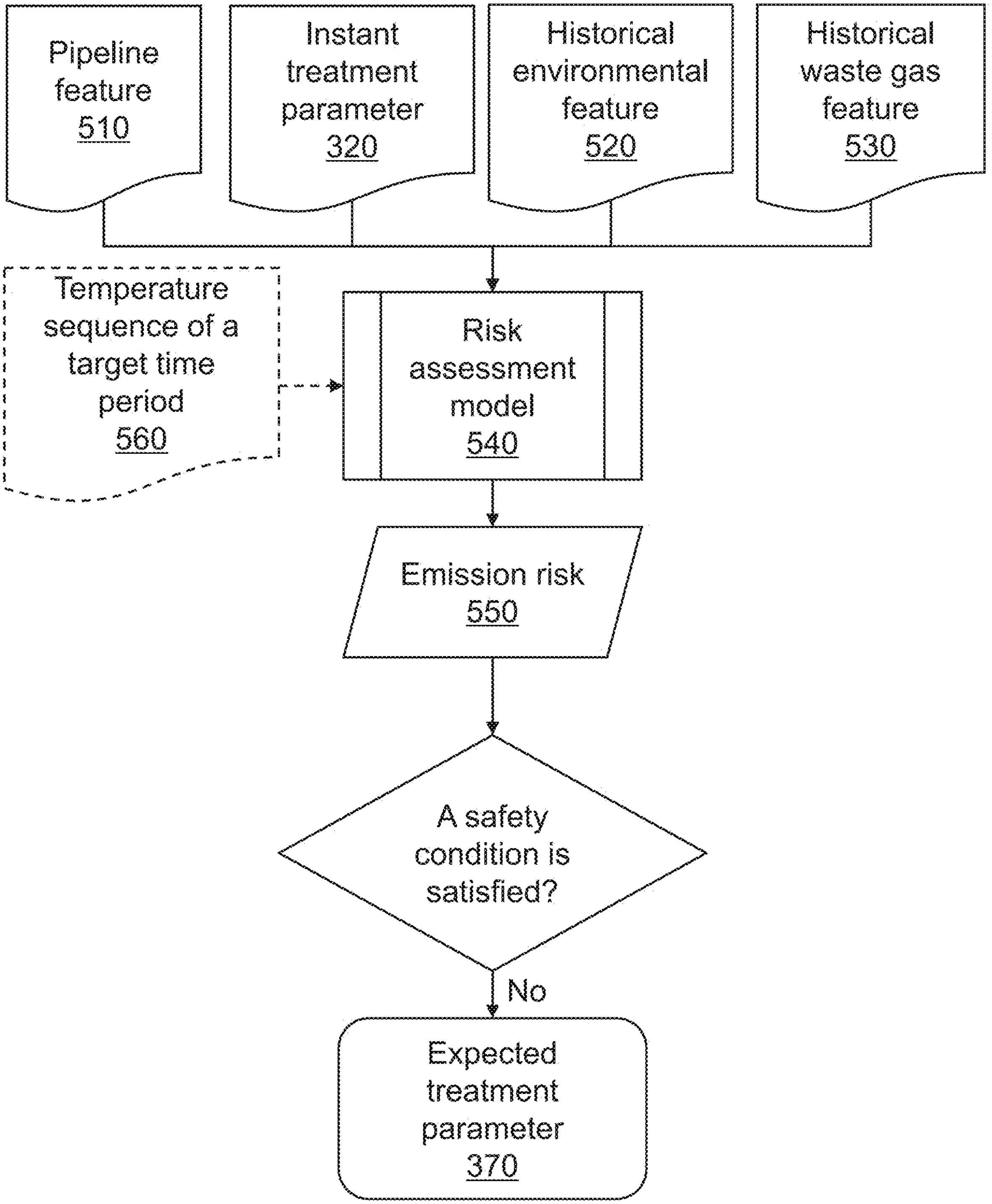
FIG. 5 is a schematic diagram illustrating a process of determining an expected treatment parameter based on an emission risk according to some embodiments of present disclosure.

FIG. 5 is a schematic diagram illustrating a process of determining an expected treatment parameter based on an emission risk according to some embodiments of present disclosure. The process of determining the expected treatment parameter based on the emission risk may include the following content, as shown in FIG. 5. In some embodiments, the process of determining the expected treatment parameter based on the emission risk may be performed by a processor of a gas company management platform.

In some embodiments, as shown in FIG. 5, the gas company management platform may assess, based on an assessment cycle, an emission risk 550 of waste gas emission from a pending pipeline through a risk assessment model 540. An input of the risk assessment model 540 may include at least one of a pipeline feature 510, an instant treatment parameter 320, a historical environmental feature 520 during a preset historical time period, and a historical waste gas feature 530 during the preset historical time period.

More descriptions regarding the emission risk, the instant treatment parameter, and the preset historical time period may be found in FIG. 3 and the related descriptions thereof.

The pipeline feature is a feature related to an attribute of the pending pipeline. For example, the pipeline feature may include, but is not limited to, a type of the pending pipeline, an adjacency matrix of the pending pipeline, etc.

The type of the pending pipeline is a result of categorizing a pipeline based on characteristics such as a position of the pending pipeline. For example, the type of the pending pipeline may be a trunk pipeline, a branch pipeline, a sub-pipeline, etc.

The adjacency matrix of the pending pipeline is a matrix used to describe a connection relationship between each pending pipeline in the system for pipeline waste gas safety treatment of smart gas based on the IoT.

In some embodiments, rows and columns of the adjacency matrix of the pending pipeline represent each pending pipeline in the system. Each element in the adjacency matrix represents whether a connection exists between two pending pipelines. For example, when the element in the adjacency matrix is 0, it indicates that there is no connection between the two pending pipelines; when the element in the adjacency matrix is 1, it indicates that there is a connection between the two pending pipelines.

In some embodiments, the gas company management platform may obtain, through the gas company sensor network platform, the pipeline feature of the pending pipeline from the smart gas equipment object platform.

The assessment cycle is a time interval for assessing the emission risk of the waste gas emission from the pending pipeline, such as 1 week, etc.

In some embodiments, the assessment cycle may be set by those skilled in the art or the system by default.

The historical environmental feature is a parameter consisting of environmental features during the preset historical time period. In some embodiments, the historical environmental feature may be represented by a sequence. For example, the historical environmental feature may be represented by $\{(t_1, P_1), (t_2, P_2), \ldots, (t_i, P_i), \ldots, (t_n, P_n)\}$. Where $P_i$ denotes a historical environmental feature corresponding to a moment $t_i$. More descriptions regarding the preset historical time period may be found in FIG. 3 and the related descriptions thereof.

In some embodiments, the gas company management platform may determine the historical environmental feature by obtaining historical data of the environmental feature of the pending pipeline and a historical moment of obtaining the environmental feature from the smart gas government safety supervision management platform.

More descriptions regarding the environmental feature may be found in FIG. 3 and the related descriptions thereof.

The historical waste gas feature is a parameter consisting of waste gas features during the preset historical time period.

In some embodiments, the historical waste gas feature may be represented by a sequence, similar to the historical environmental feature, with the difference that the historical waste gas feature may include the waste gas feature at each moment during the preset historical time period.

In some embodiments, the gas company management platform may determine the historical waste gas feature by obtaining the waste gas feature in the historical data, and a moment of obtaining the waste gas feature.

More descriptions regarding the waste gas feature may be found in FIG. 2 and the related descriptions thereof.

The risk assessment model refers to a model used to assess the emission risk of the waste gas emission from the pending pipeline. In some embodiments, the risk assessment model may be a machine learning model, such as a deep neural networks (DNN) model, etc.

In some embodiments, an input of the risk assessment model may include the pipeline feature of the pending pipeline, the instant treatment parameter of the waste gas treatment device in the pending pipeline, the historical environmental feature of the pending pipeline during the preset historical time period, and the historical waste gas feature during the preset historical time period. An output of the risk assessment model may include the emission risk of the waste gas emission from the pending pipeline.

In some embodiments, the risk assessment model may be obtained by training based on a large number of first training samples with first labels. The gas company management platform may input the plurality of the first training samples with the first labels into an initial risk assessment model, construct a loss function based on the first labels and results of the initial risk assessment model, and iteratively update the initial risk assessment model based on the loss function. The model training may be completed when a preset condition is satisfied, and a trained risk assessment model may be obtained. The preset condition may be that the loss function converges, a count of iterations reaches a threshold, etc.

In some embodiments, the first training samples may be a sample pipeline feature corresponding to a sample pending pipeline in the historical data, a sample instant treatment parameter of a sample waste gas treatment device in the sample pending pipeline, a sample preset historical time period during a sample historical environmental feature, and a sample historical waste gas feature during the sample preset historical time period.

In some embodiments, the first labels may be an emission risk of waste gas emission from the sample pending pipeline. In some embodiments, the gas company management platform may cluster the first training samples and count a count of times that training samples corresponding to each cluster have an emission incident during a waste gas emission work in a subsequent time period, and obtain a result by dividing this count of times by the count of the training samples corresponding to the cluster to be used as one of the first labels corresponding to the training samples of the cluster. The subsequent time period is a time period after the sample preset historical time period, which may be determined based on prior experience and/or actual needs. The count of times that training samples corresponding to each cluster have an emission incident refers to a count of adverse events and/or unexpected situations that occur during the process of waste gas emission.

In some embodiments, the input of the risk assessment model 540 may further include a temperature sequence 560 of a target time period.

The target time period is a time period used to obtain the temperature sequence, such as 1 hour, etc.

The temperature sequence is a sequence consisting of temperatures around the pending pipeline during the target time period. In some embodiments, the configuration of the temperature sequence is similar to the configuration of the historical environmental feature, with the difference that the temperature sequence may include temperatures around the pending pipeline at each moment.

Correspondingly, when the input of the risk assessment model includes the temperature sequence of the target time period, the first training samples may include a temperature sequence of a sample target time period accordingly.

In some embodiments of the present disclosure, the temperature affects the diffusion and transmission rate of the waste gas, and a higher temperature generally accelerates the diffusion rate of the gas, making the gas be diluted and dispersed into the surrounding environment more quickly, which in turn affects the distribution of pollutant concentrations and the duration of a peak concentration. Therefore, considering the temperature around the pending pipeline when assessing the emission risk can improve the accuracy of the risk assessment model.

In some embodiments of the present disclosure, the risk assessment model may be obtained by training based on an initial risk assessment model. Training samples used for training the risk assessment model may include at least one collection category, and a count of samples in each of the at least one collection category may be greater than a count threshold corresponding to the collection category. The count threshold may be correlated with connection information of a gas pipeline in the collection category.

The collection category refers to that a sampling region is divided into a plurality of regions according to latitudes and longitudes, and each of the regions serves as one collection category.

The count threshold is a threshold used to characterize whether the amount of the training samples in this collection category is abundant.

In some embodiments, each collection category may correspond to one count threshold.

For example, the gas company management platform may categorize a region in the sampling region with a longitude being within 0-10 and a latitude being within 0-10 as a collection category 1, and a corresponding count threshold is A; categorize a region in the sampling region with a longitude being within 0-10 and a latitude being within 0-20 as a collection category 2, and a corresponding count threshold is B.

In some embodiments of the present disclosure, the more complex the connection information of the gas pipeline in the collection category, the larger the count threshold. For example, the connection information being complex means that the connection relationship between the pending pipeline in the system is complex and diverse. For example, the connection information being complex means a diverse connection mode between the pending pipelines, or a large count of connections, etc.

The connection information is information that characterizes the connection relationship between the pending pipeline and other pipelines. The connection information may be expressed in terms of an adjacency matrix of the pending pipeline in the collection category. More descriptions regarding the adjacency matrix may be found in the related descriptions of FIG. 5 above.

In some embodiments of the present disclosure, the more complex the connection between the pending pipeline, and the greater the impact on the surrounding pipeline when the pending pipeline emits the waste gases, the greater the assessment complexity of the emission risk. Accordingly, the training effect of the risk assessment model can be ensured by collecting more training samples.

In some embodiments, as shown in FIG. 5, in response to determining that the emission risk 550 does not satisfy a safety condition, the gas company management platform may determine the expected treatment parameter 370 corresponding to the preset future time point.

In some embodiments, the gas company management platform may uniformly reduce the operation efficiency of each waste gas treatment device (e.g., reduce the speed of the induced draft fan, and reduce the power of the filter device) until the emission risk is less than the risk threshold.

In some embodiments, the risk threshold may be correlated with the environmental feature of the pending pipeline.

More descriptions regarding the risk threshold and the environmental feature may be found in FIG. 3 and the related descriptions thereof.

In some embodiments, the risk threshold may be negatively correlated with a weighted sum of a flow of people, a traffic congestion index, and an air mobility in the environmental feature.

More descriptions regarding the weighted sum of the flow of people, the traffic congestion index, and the air mobility in the environmental feature may be found in FIG. 3 and the related descriptions thereof.

In some embodiments of the present disclosure, the larger the weighted sum of the flow of people, the traffic congestion index, and the air mobility in the environmental feature is, the more people and the more vehicles are in the vicinity of the pending pipeline. In this case, the risk threshold may be appropriately reduced to ensure the safety of the waste gas emission work.

In some embodiments of the present disclosure, the pipeline feature of the pending pipeline is obtained from the smart gas equipment object platform through the gas company management platform and the sensor network platform, which ensures that the system grasps detailed information of the pipeline, and provides an accurate data base for subsequent risk assessment. In addition, the risk assessment model constructed based on the assessment cycle through the machine learning model assesses the emission risk of the pending pipeline by synthesizing the pipeline feature, the instant treatment parameter, the historical environmental feature, and the historical waste gas feature, which improves the accuracy and reliability of the model assessment. When the emission risk is greater than the risk threshold, the expected treatment parameter corresponding to the preset future time point is determined, which optimizes the process of the waste gas treatment, and improves the safety and overall treatment efficiency of the waste gas treatment.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and "some embodiments" mean that a particular feature, structure, or feature described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures, or features may be combined as suitable in one or more embodiments of the present disclosure.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various parts described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, numbers describing the number of ingredients and attributes are used. It should be understood that such numbers used for the description of the embodiments use the modifier "about", "approximately", or "substantially" in some examples. Unless otherwise stated, "about", "approximately", or "substantially" indicates that the number is allowed to vary by ±20%. Correspondingly, in some embodiments, the numerical parameters used in the description and claims are approximate values, and the approximate values may be changed according to the required features of individual embodiments. In some embodiments, the numerical parameters should consider the prescribed effective digits and adopt the method of general digit retention. Although the numerical ranges and parameters used to confirm the breadth of the range in some embodiments of the present disclosure are approximate values, in specific embodiments, settings of such numerical values are as accurate as possible within a feasible range.

For each patent, patent application, patent application publication, or other materials cited in the present disclosure, such as articles, books, specifications, publications, documents, or the like, the entire contents of which are hereby incorporated into the present disclosure as a reference. The application history documents that are inconsistent or conflict with the content of the present disclosure are excluded, and the documents that restrict the broadest scope of the claims of the present disclosure (currently or later attached to the present disclosure) are also excluded. It should be noted that if there is any inconsistency or conflict between the description, definition, and/or use of terms in the auxiliary materials of the present disclosure and the content of the present disclosure, the description, definition, and/or use of terms in the present disclosure is subject to the present disclosure.

Finally, it should be understood that the embodiments described in the present disclosure are only used to illustrate the principles of the embodiments of the present disclosure. Other variations may also fall within the scope of the present disclosure. Therefore, as an example and not a limitation, alternative configurations of the embodiments of the present disclosure may be regarded as consistent with the teaching of the present disclosure. Accordingly, the embodiments of the present disclosure are not limited to the embodiments introduced and described in the present disclosure explicitly.

What is claimed is:

1. A system for pipeline waste gas safety treatment of smart gas based on an Internet of Things (IoT), wherein the system comprises a smart gas government safety supervision management platform, a smart gas government safety supervision sensor network platform, a gas company management platform, a gas company sensor network platform, and a smart gas equipment object platform;

the gas company management platform includes a processor, and the gas company management platform is configured to:

determine, based on a waste gas treatment level of a pending pipeline, a waste gas emission standard for the pending pipeline;

in response to determining that the pending pipeline begins to emit waste gas, obtain, through the gas company sensor network platform, an instant treatment parameter of a waste gas treatment device in the pending pipeline from the smart gas equipment object platform;

determine, based on the waste gas emission standard, the instant treatment parameter, and the waste gas feature, a standard treatment efficiency;

obtain, through the smart gas government safety supervision sensor network platform, an environmental feature of the pending pipeline from the smart gas government safety supervision management platform;

determine, based on the environmental feature and the standard treatment efficiency, a target treatment efficiency;

determine, based on the target treatment efficiency, an expected treatment parameter corresponding to a preset future time point; and generate, based on the expected treatment parameter, an adjustment instruction and send the adjustment instruction to the smart gas equipment object platform through the gas company sensor network platform to control the smart gas equipment object platform to adjust a treatment parameter of the waste gas treatment device based on the adjustment instruction.

2. The system of claim 1, wherein the gas company management platform is further configured to:

obtain, through the gas company sensor network platform, a pipeline parameter of the pending pipeline and a historical pressure adjustment parameter sequence of a preset historical time period from the smart gas equipment object platform;

determine, based on the pipeline parameter and the historical pressure adjustment parameter sequence, a volume of waste gas under treatment;

determine, based on the volume of waste gas under treatment and the target treatment efficiency, a waste gas treatment time; and in response to determining that the waste gas treatment time does not satisfy a duration condition, determine the expected treatment parameter corresponding to the preset future time point, the duration condition including a duration threshold.

3. The system of claim 1, wherein the gas company management platform is further configured to:

obtain, through the gas company sensor network platform, a pipeline feature of the pending pipeline from the smart gas equipment object platform;

assess, based on an assessment cycle, an emission risk of waste gas emission from the pending pipeline through a risk assessment model; wherein an input of the risk assessment model includes at least one of the pipeline feature, the instant treatment parameter, a historical environmental feature during a preset historical time period, and a historical waste gas feature during the preset historical time period; the risk assessment model is a machine learning model; and in response to determining that the emission risk does not satisfy a safety condition, determine the expected treatment parameter corresponding to the preset future time point, the safety condition including a risk threshold.

4. The system of claim 3, wherein the risk threshold is related to a environmental feature of the pending pipeline.

5. A method for pipeline waste gas safety treatment of smart gas based on an Internet of Things (IoT), implemented by a processor of a gas company management platform of an Internet of Things (IoT) system for pipeline waste gas safety treatment of smart gas, comprising:

determining, based on a waste gas treatment level of a pending pipeline, a waste gas emission standard for the pending pipeline;

in response to determining that the pending pipeline begins to emit waste gas, obtaining, through a gas company sensor network platform, an instant treatment parameter of a waste gas treatment device in the pending pipeline from a smart gas equipment object platform;

determining, based on the waste gas emission standard, the instant treatment parameter, and the waste gas feature, a standard treatment efficiency;

obtaining, through a smart gas government safety supervision sensor network platform, an environmental feature of the pending pipeline from a smart gas government safety supervision management platform;

determining, based on the environmental feature and the standard treatment efficiency, a target treatment efficiency;

determining, based on the target treatment efficiency, an expected treatment parameter corresponding to a preset future time point; and generating, based on the expected treatment parameter, an adjustment instruction and sending the adjustment instruction to the smart gas equipment object platform through the gas company sensor network platform to control the smart gas equipment object platform to adjust a treatment parameter of the waste gas treatment device based on the adjustment instruction.

6. The method of claim 5, wherein the determining, based on the target treatment efficiency, the expected treatment parameter corresponding to the preset future time point includes:

obtaining, through the gas company sensor network platform, a pipeline parameter of the pending pipeline and a historical pressure adjustment parameter sequence of a preset historical time period from the smart gas equipment object platform;

determining, based on the pipeline parameter and the historical pressure adjustment parameter sequence, a volume of waste gas under treatment;

determining, based on the volume of waste gas under treatment and the target treatment efficiency, a waste gas treatment time; and in response to determining that the waste gas treatment time does not satisfy a duration condition, determining the expected treatment parameter corresponding to the preset future time point, the duration condition including a duration threshold.

7. The method of claim 5, wherein the determining, based on at least one of the waste gas emission standard, the instant treatment parameter, and a waste gas feature, an expected treatment parameter corresponding to a preset future time point includes:

obtaining, through the gas company sensor network platform, a pipeline feature of the pending pipeline from the smart gas equipment object platform;

assessing, based on an assessment cycle, an emission risk of waste gas emission from the pending pipeline through a risk assessment model; wherein an input of the risk assessment model includes at least one of the pipeline feature, the instant treatment parameter, a historical environmental feature during a preset historical time period, and a historical waste gas feature during the preset historical time period; the risk assessment model is a machine learning model; and in response to determining that the emission risk does not satisfy a safety condition, determining the expected treatment parameter corresponding to the preset future time point, the safety condition including a risk threshold.

8. The method of claim 7, wherein the risk threshold is related to an environmental feature of the pending pipeline.

* * * * *